US007991631B2

(12) United States Patent
Iskandar et al.

(10) Patent No.: US 7,991,631 B2
(45) Date of Patent: Aug. 2, 2011

(54) MANAGING A MULTI-SUPPLIER ENVIRONMENT

(75) Inventors: Rayan R. Iskandar, NSW (AU); Kenneth W. Poddany, Edgewater, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 12/029,860

(22) Filed: Feb. 12, 2008

(65) Prior Publication Data

US 2009/0204452 A1  Aug. 13, 2009

(51) Int. Cl.
*G06F 17/50* (2006.01)

(52) U.S. Cl. ........ 705/7; 705/1; 705/30; 705/8; 705/348

(58) Field of Classification Search .................. 705/7, 1, 705/30, 348
See application file for complete search history.

(56) References Cited

U.S. PATENT DOCUMENTS

| | | | | |
|---|---|---|---|---|
| 6,141,754 A | * | 10/2000 | Choy | ................................ 726/1 |
| 6,606,603 B1 | * | 8/2003 | Joseph et al. | ................... 705/26 |
| 7,222,116 B2 | | 5/2007 | Bello et al. | |
| 2002/0147622 A1 | * | 10/2002 | Drolet et al. | ...................... 705/7 |
| 2002/0174032 A1 | * | 11/2002 | Chien | ............................. 705/26 |
| 2002/0188486 A1 | * | 12/2002 | Gil et al. | ........................... 705/7 |
| 2004/0181606 A1 | | 9/2004 | Astor et al. | |
| 2004/0243459 A1 | * | 12/2004 | Geritz et al. | ................... 705/10 |
| 2008/0270977 A1 | * | 10/2008 | Nucci et al. | .................. 717/105 |

* cited by examiner

*Primary Examiner* — Vanel Frenel

(57) ABSTRACT

The present disclosure is directed to a system and method for managing multi-supplier environment. In some implementations, a method includes identifying a supplier model configured to identify information for executing different aspects of the transaction associated with different enterprise departments and a primary supplier from a plurality of selectable third-party suppliers in response to at least a request for a enterprise transaction. The model is configured to identify methodologies for executing the different aspects of a transaction. A plurality of requests for the different enterprise departments and the primary supplier are generated based, at least in part, on the supplier model and the transaction request. Each of the different enterprise departments and the primary supplier are associated with at least one of the plurality of requests. Each of the plurality of requests are automatically transmitted to at least one of the associated enterprise departments or the primary supplier in accordance with the supplier model.

18 Claims, 5 Drawing Sheets

FIGURE 2

The MSI model covers the following modules:

| Process | Assessment, Optimization and Implementation |
|---|---|
| Interface | Product, Client, Finance, Supplier, Employee, Users |
| Event | Service Request, Incident |
| Role & Responsibilities | Responsible, Approver, Support, Informed, Consulted |
| Task | Activity, Instruction |
| Tool | Tool Steps, Templates & Forms |
| Information Source | Data Type & Format |
| Work Flow | Routing transactions for review or approval |
| Output | End result or process outcome |
| View & Presentation | Report, Dashboard, Analysis |
| Audit & Security | Data privacy, Risk assessment, Activities logging & tracking |
| Error Handling | Restore Operation, Recover Data, Avoid same error, Zero Outage |

202 204

MANAGING A MULTI-SUPPLIER ENVIRONMENT

TECHNICAL FIELD

This invention relates to data communication and, more particularly, to managing a multi-supplier environment.

BACKGROUND

Providing goods and services typically requires an enterprise to perform multiple tasks or other entities to perform associated tasks. These tasks may include the use of software, hardware, or other technology. In addition, these tasks may also require that individuals perform certain management or supporting tasks. These tasks can be fairly complex requiring multiples steps and/or processes. Frequently, enterprises optimize such processes by using one or more of the following International Standards, frameworks and/or best practices: ITIL ver2, ITIL ver3 (Released May 2007), ISO/IEC 20000 (Released April 2007), CMMI ACQ & SRV v1.2, COBIT4.0, ISO 17799 and eSCM-SP v2. Design For Six Sigma framework (DFSS) & Lean Six Sigma.

SUMMARY

The present disclosure is directed to a system and method for managing multi-supplier environment. In some implementations, a method includes identifying a supplier model configured to identify information for executing different aspects of the transaction associated with different enterprise departments and a primary supplier from a plurality of selectable third-party suppliers in response to at least a request for a enterprise transaction. The model is configured to identify methodologies for executing the different aspects of a transaction. A plurality of requests for the different enterprise departments and the primary supplier are generated based, at least in part, on the supplier model and the transaction request. Each of the different enterprise departments and the primary supplier are associated with at least one of the plurality of requests. Each of the plurality of requests are automatically transmitted to at least one of the associated enterprise departments or the primary supplier in accordance with the supplier model.

In some aspects of operation, the disclosure may provide a multi-supplier model that has one or more of the following properties: dynamic as it can scale to fit most enterprise environment and industries; flexible as it can be used in total, partial or just selected modules; evolving with built in intelligence to adapt and improve; ease of use the model is logical and may not need special tools; transparency support as running in the background of multiple implementation; governance introduce governance to "Data in Motion" across an enterprise; compliant with Best Practices, Standards and Frameworks and has been mapped to, for example, ITIL v3, and/or others.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is an example supplier model of FIG. 1 in accordance with some implementations of the present disclosure;

DETAILED DESCRIPTION

Figure 1:
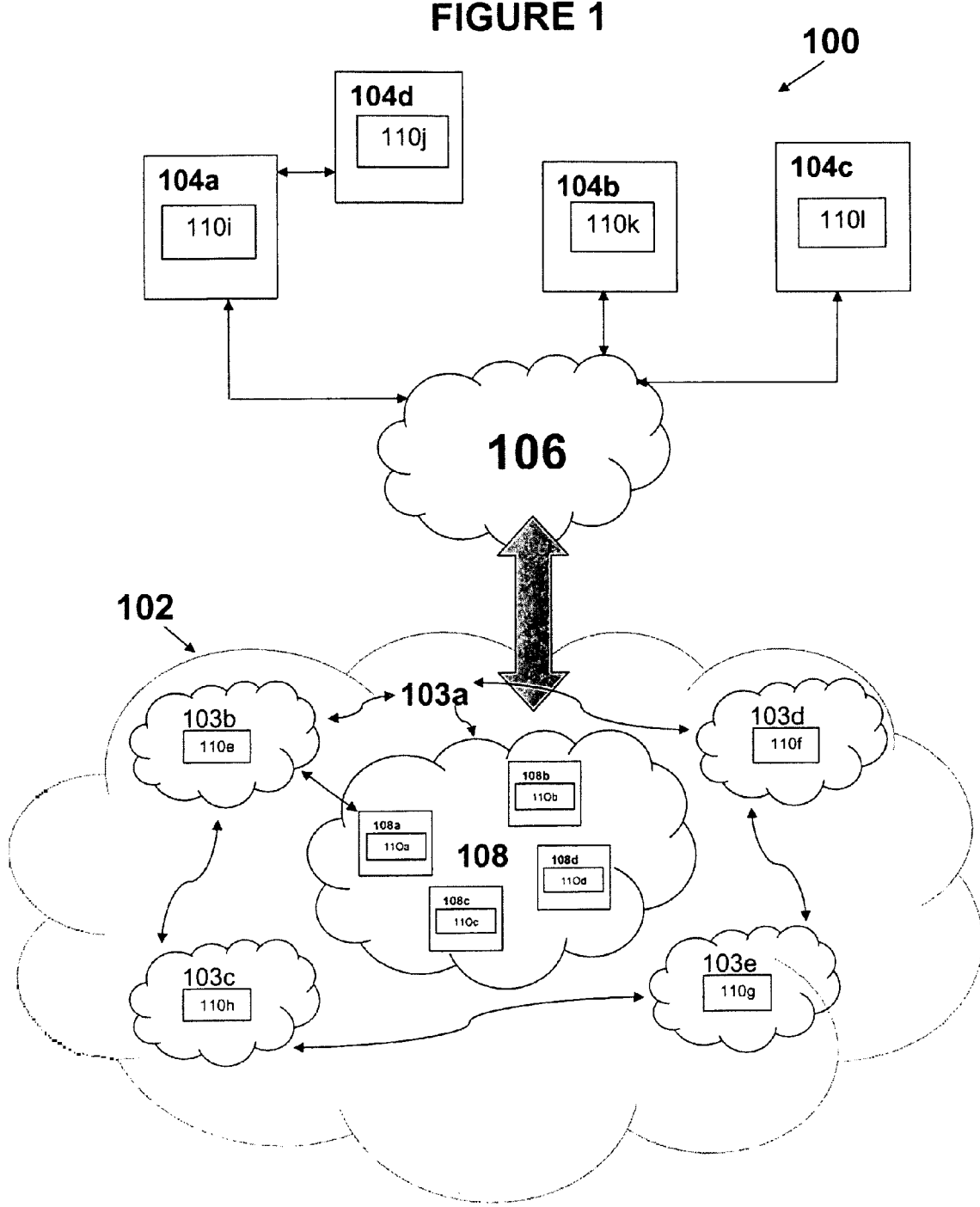
FIG. 1 is a management system in accordance with some implementations of the present disclosure.

FIG. 1 is a management system 100 for managing a multi-supplier environment in accordance with some implementations from the present disclosure. For example, the system 100 may manage third-party suppliers in accordance with a previously generated supplier model. In some implementations, the system 100 can implement supplier models for service management, business transformation, common services, automation implementation and/or standards/frameworks assessment and audits. A supplier model may include technical information (e.g., data format, network interface, application interface), logical information (e.g., workflow, supplier hierarchy) as well as other information for executing a transaction. In some implementations, a transaction may include transmitting requests, interfacing third-party suppliers, legal and contractual approvals, routing transactions for approval, billing, and/or other as aspects of transactions. For example, the system 100 may provide the ability to manage the development, acquisition and/or maintenance of products and/or services supplied to an enterprise from different performing suppliers at different stages of deployment. In some implementations, the system 100 can align processes, improve them and/or ensures a high level of stability, capability and/or maturity to the integration of different services. The system 100 may provide one or more of the following for executing a transaction: structured flexibility that can adapt and/or expand according to the enterprise business needs and/or requirements; independent layers that can be run as separate offerings without loosing the links to the other layers; built in continuous improvement loops that strengthen and/or enhance the supplier model robustness; overall understanding of the total service management life cycle; and/or others. In some implementations, the system 100 can provide an end-to-end methodology that covers enterprise requirements in a multi-supplier environment.

At a high level, the system 100 includes an enterprise network 102 coupled to suppliers 104a-c through a network 106. The enterprise network 102 includes a plurality of enterprise departments 103, having assets 108, are configured to manage or otherwise process different aspects of transactions with the suppliers 104a-c in accordance with one or more multi-supplier models 110. The models 110 may identify instructions, guidelines, or directives for identifying, transmitting, servicing, or otherwise processing transactions for products and/or services. For example, an asset 108 may automatically transmit one or more documents and/or information formatted for particular departments 103 and supplier 104 in accordance with the model 110. In response to at least a request, the suppliers 104 may provide products and/or services in accordance with the associated model 110. For example, the supplier 104 may follow methodologies identified in the model to verify approval, provide services, invoice the services, and/or other aspects. In some implementations, a primary supplier 104a may transmit the request to a secondary supplier 104d in accordance with the associate model 110.

As for a more detailed description of the elements, the enterprise network 102 is a network associated with an enterprise. The enterprise may comprise a corporate or business entity, a government body, a non-profit institution, or any other organization with a plurality of assets 108. The enterprise may be the owner of assets 108. Of course, the enterprise may also lease assets 108 or may hire contractors or agents who are responsible for maintaining, configuring, controlling, and/or managing assets 108. In the illustrated implementation, the enterprise network 102 includes a plurality of departments 103. The departments 103 may associated with different aspects of the enterprise such as research and development, accounting, production, legal, and/or other departments. In some implementations, execution of a transaction may include approval or at least processing from multi departments 103. Multiple departments 103 may automatically coordinate the different aspects of a transaction using the multi-supplier models 110. In some embodiment, the enterprise manages the requests for third-party products and/or services through the enterprise network 102. For example, the enterprise may manage requests to suppliers 104 in accordance with one or more models 110.

In the illustrated embodiment, the enterprise network 102 facilitates wireless and/or wireline communication between the assets 108 and/or the network 106. The enterprise network 102 may communicate, via a medium for example, Internet Protocol (IP) packets, Frame Relay frames, Asynchronous Transfer Mode (ATM) cells, voice, and/or video, data, and other suitable information (for example graphs or drawings) between network addresses identified internal or external to the enterprise following a selective path and work flow depending on the nature of the request raised. In addition, while the enterprise network 102 is illustrated as a single network, the enterprise network 102 may comprise a plurality of networks related, for example, to different activities, departments within the enterprise, and/or hierarchical splits. In short, the enterprise network 102 is any suitable network that includes assets 108.

As described above, the assets 108 comprise devices associated with the enterprise and may include computers, servers, routers, data storage devices, a personal computer, a workstation, network computer, personal data assistant (PDA), one or more processors within these or other devices, or any other suitable processing device. Each asset 108 may be associated with a group 103 and/or an individual within a department 103. For example, a group of assets 108 may be associated with a corporate department 103 (e.g., accounting, marketing, research and development), a geographic or network (sub-net) region (e.g., United States, Europe), a location (e.g., building, floor in building), a customized group (e.g., "Bill's Group"), or any other suitable categorization of assets 108. Each asset 108 executes, references, includes, or is otherwise associated with requests for products and/or services from one or more suppliers 104. In the illustrated implementation, the assets 108 can direct requests and/or other actions associated with requested products and/or services (e.g., accounting) in accordance with one or more models 110.

Supplier models 110 comprises any rules, instructions, algorithms, code, spreadsheets, flow charts, work flows and/or other directives used by assets 108 and/or suppliers 104 to execute transactions. For example, the multi-supplier model 110 may include one or more entries or data structures that identify a product, process information (e.g., implementation), billing information, and/or other data. In some implementations, the multi-supplier model 110 may include information associated with one or more of the following: process, interface, event, roles & responsibilities, task, tool, information source, work flow, output, view & presentation, audit & security, error handling, and/or other information. For example, the multi-supplier model 110 may provide best practices for executing a transaction. In addition, the multi-supplier model 110 may include directives for implementing identified methods, workflows, and/or other actions. For example, the multi-supplier model 110 may include or identify technology, processes, and/or people to implement the methodologies modeled by the associated supplier model 110. For example, the multi-supplier model 110 may identify a plurality of documents associated with different departments 103, automatically populate the documents with information and transmit the information to the appropriate departments 103. As mentioned above, the multi-supplier model 110 may include a workflow to replace an existing activity in a transaction. In some implementations, the multi-supplier model 110 may include or otherwise identify code to use in satisfying, for example, a request. In addition, the enterprise may periodically replace or modify technology, processes and/or workflows in the multi-supplier model 110. The multi-supplier model 110 may include a presentation layer to enable a complete view of incidents and/or service requests investigated or supplied from multiple suppliers, displayed on a WEB portal, taking into consideration the appropriate security measures, conforming with data privacy acts and able to monitor supplier performance to drive the rectification of errors in operations and/or delivery of service in minimum delays.

Methodologies included in the multi-supplier model 110 may be usable by humans, devices, or a combination of the two. In some implementations, the data used in the multi-supplier model 110 may be stored or processed in any suitable format such as, for example, a text file, binary file, an XML document, a flat file, a comma-separated value (CSV) file, a name-value pair file, structured query language (SQL) table, one or more libraries, or others. The multi-supplier model 110 may be dynamically created or populated by one or more assets 108, a third-party vendor, any suitable user of the enterprise network 102, loaded from a template, or received via network 106. The term "dynamically" as used herein, generally means that the appropriate processing is determined at run-time based upon the appropriate information.

Suppliers 104a-c comprises an electronic device (e.g., computing device) operable to receive, transmit, process and store information associated with requests from the enterprise network 102. For example, the supplier 104 may receive a request for software updates from the asset 108 and transmit and bill for the update in accordance to an associated model 110. In general, the supplier 104 may execute one or more of the following: receive requests from the enterprise network 102 that was initiated by assets 108 then approved by departments 103; identify one or more models 110 associated with the request; determine ability to satisfy request; transmit request to different supplier 104 in accordance with the associated model 110; provide services and/or products to the network 102 in accordance with the multi-supplier model 110; and/or other functions. In some implementations, the supplier 104 is a third-party supplier. The suppliers 104 may be ranked such that suppliers 104 are contact in particular order. For example, the multi-supplier model 110 may identify the supplier 104a as a primary provider while the supplier 104d is a secondary supplier. In the case that the primary supplier 104a is not able to satisfy a request, the primary supplier 104a may transmit the request to the second supplier 104d in accordance with the multi-supplier model 110. Supplier 104d fulfill the request deliver the service in accordance to the multi-supplier model 110 and bill supplier 104a for the service. At this stage supplier 104a will raise an invoice to enterprise 102 for payment. The RtP (Request to Pay) may be routed to the correct department 103 follow the selected path as per the multi-supplier model 110 and reach Accounts Payable after receiving approvals per the multi-supplier model 110 and automatically release the payment to supplier 104a who may in turn will pay supplier 104d for the service or product provided.

Network 106 facilitate wireless or wireline communication between server 106 and any other local or remote computer, such as assets 108 and suppliers 104. Network 106 may be all or a portion of an enterprise or secured network. While illustrated as single network, network 106 may be a continuous network logically divided into various sub-nets or virtual networks without departing from the scope of this disclosure, so long as at least portion of network 106 may facilitate communications of transaction requests between suppliers 104 and at least one asset 108. In some implementations, network 106 encompasses any internal or external network, networks, sub-network, or combination thereof operable to facilitate communications between various computing components in the system 100. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the multi-supplier model 110 may be a method of integrating multiple performing suppliers 104 for a single enterprise's organization by establishing a virtual environment (e.g., transparent to users) of an end-to-end service management. For example, the multi-supplier model 110 may cover one or more of the following: activities performed by end users raising issue, middle ware, service provider front desk, technician on site, recovery of service, closure of issue, internal billing, client facing contract and legal. Associated information may be displayed in a single view (e.g., WEB based portal). In some implementations, the system 100 may execute one or more of the following: collect information by performing an enterprise service assessment that will define organization strategies and develop its service portfolio; investigate each process in order to optimize its function and deliver a complete process documentation and service catalogue; compare and challenge each documented process against best practices in its category in order to improve each process and raise its standard; provide a vendor management office and a complete enterprise data model structure; investigate the delivery of each process, its interface and the way it integrates with other processes in order to select the best technology solution and partner to automate them; provide a suitable technology solution catering for flexibility, expandability, scalability and maximum leveragability and reusability of its modules; implement and deploy the proposed solution via a controlled management of change affecting the whole organization; provide a total solution of multiple supplier integration to the operation management to maintain and sustain while looking continuously for methods of improvement; and/or others.

FIG. 2 illustrates an example model 110 of FIG. 1 in accordance with some implementations of the present disclosure. It will be understood that the illustrated model is for example purposes only. Accordingly, the system 100 may include or present information in any format or descriptive language, and each page may present any appropriate advertising information in any layout without departing from the scope of the disclosure.

In particular, the multi-supplier model 110 includes modules 202 and associated parameters 204 for executing actions associated with a request for services and/or products. For example, the multi-supplier model 110 may include a billing module that identifies a process and information for billing for services provided to the enterprise network 102. In the illustrated implementation, the multi-supplier model 110 includes the following modules 202: process, interface, event, roles & responsibilities, task, tool, information source, work flow, output, view & presentation, audit & security, and error handling. Though, the multi-supplier model 110 may include some, all, or none of these illustrated modules 202 without departing from the scope of this disclosure.

Each module 202 may includes or otherwise identify associated parameters 204. The process module 202 may identify the following parameters: assessment, optimization, and implementation. The interface module 202 may identify the following parameters: product, client, finance, supplier, employee, and users. The event module 202 may identify the following parameters: service request and incident. The roles & responsibility module 202 may identify the following parameters: responsible, approver, support, informed, and consulted. The task module 202 may identify the following parameters: activity and instruction. The tool module 202 may identify the following parameters: tool steps, templates, and forms. The information-source module 202 may identify the following parameters: data type and format. The work flow module 202 may identify the following parameters: routing transactions for review or approval. The output module 202 may identify the following parameters: end results or process outcome. The view & presentation module 202 may identify the following parameters: report, dashboard and analysis. The audit & security module 202 may identify the following parameters: data privacy, risk assessment, and activities logging and tracking. The error handling module 202 may identify the following parameters: restore operation, recover data, avoid same error, and zero outage. These parameters 204 are for illustration purposes only and the multi-supplier model 110 may include some, all or none of these parameters 204. In addition, these parameters 204 may be associated with different modules 202 without departing from the scope of this disclosure.

Figure 3:
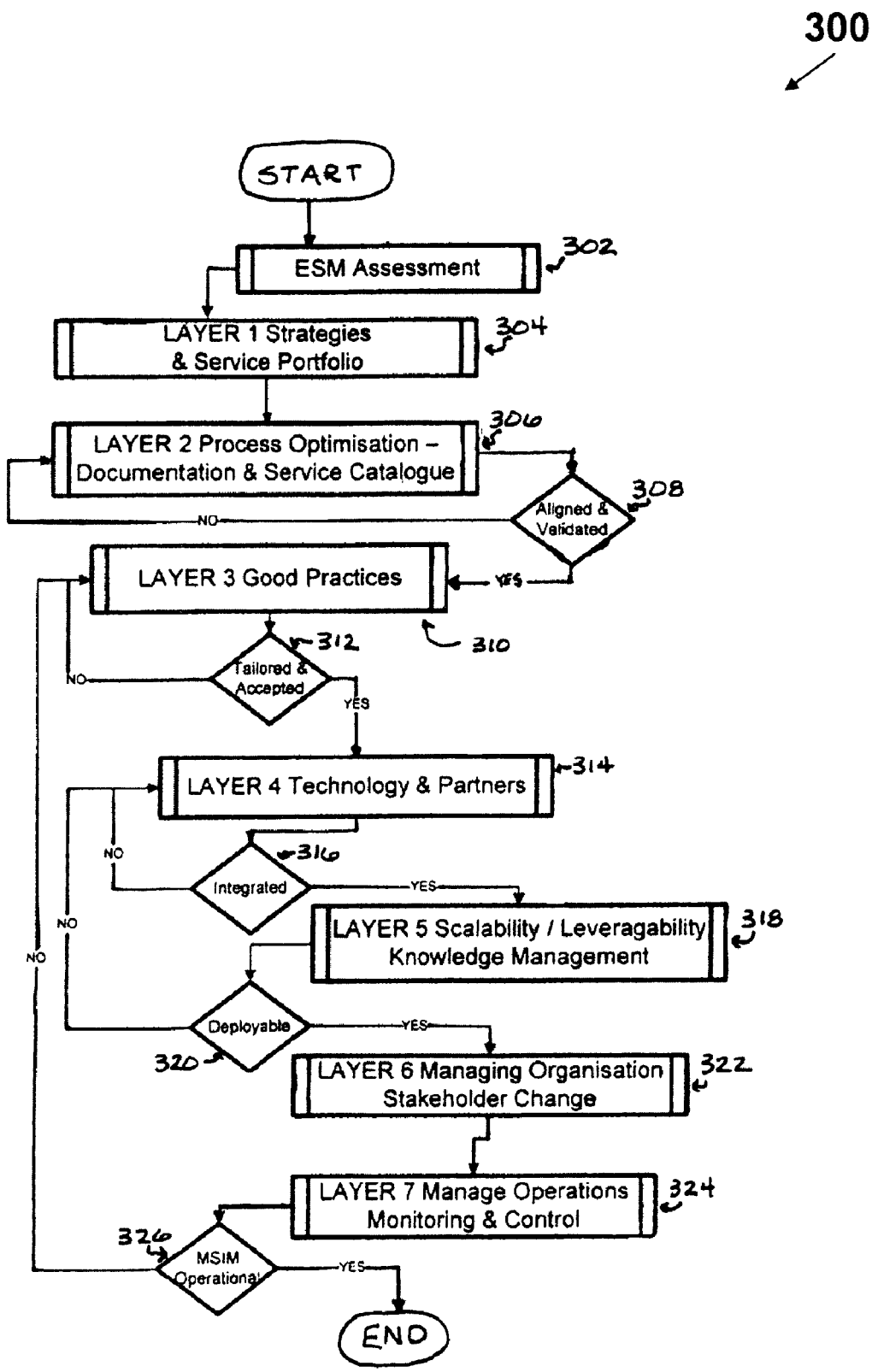
FIG. 3 is a flow chart illustrating an example for generating a supplier model.

FIG. 3 is a flow chart illustrating example method for maintaining a supplier model 110 of FIG. 1 in accordance with some implementations of the present disclosure. In general, the method 300 describes generating one or more supplier models 110 for requesting and/or receiving services from the suppliers 104. Method 300 contemplates using any appropriate combination and arrangement of logical elements implementing some or all of the described functionality.

At a high level, the method 300 includes seven layers: Layer 1 Strategies & Servcice Portfolio, Layer 2 Process Optimisation—Documentation & Service Catalogue, Layer 3 Good Practices, Layer 4 Technology & Partners, Layer 5 Scalability/Leveragability knowledge Management, Layer 6 Managing Organisation Stakeholder Change and Layer 7 Manage Operations Monitoring & Control. Method 300 begins at step 302 where the current system 100 is assessed. For example, the step 302 may use automated scripts and/or manual templates to collect data and load the collected data into an assessment program to generate assessment results. Next, at step 304, the assessment information is associated with strategies and service portfolio. For example, the assessment information may be correlated with enterprise strategies, policies, goals, and/or objectives. In some implementations, the system 100 determines the current state of enterprise operations and projected operations after implementing the multi-supplier model 110. The step 304 may include building a service portfolio in the event that a portfolio has not been previously generated by the enterprise. In some implementations, the building of a service portfolio may be automated then leveraged to other instances. At step 306, the enterprise processes are optimized. In some implementations, the optimization process may include documentation and/or service catalogue. In the event that the enterprise does not have standard processes or has not documented or updated them, the system 100 may use techniques that optimize or otherwise improve current processes. For example, the system 100 may implement Lean Six Sigma tools to improve the identified processes. In some implementations, the step 306 may include one or more of the following: identify interdependencies, chain reactions, performance degradation opportunities for premium value creation, and/or other techniques. In addition, the step 306 may include updating and/or completing a service catalogue of services currently offered to the enterprise such as users of assets 108. If the improved processes are not aligned and/or validated at decision step 308, then execution of method 300 returns to the step 306. If the improved processes are aligned and validated, then the identified current processes are mapped to identified practices at step 3 10. For example, the current processes may be mapped to standard, framework and/or good practices, and/or tailored to the enterprise's environment for full or partial automation. In some implementations, the step 306 includes identifying best fit technology and/or partners that can execute these processes. The enterprise may elect to forgo this step in such cases as the current tool in use is adequate, acceptable, and/or able to customize to match the updated processes formalized in the previous step. If the improved processes are not tailored and/or accepted at decision step 312, then execution returns to the step 310. If the improved processes are tailored and/or accepted, then execution of the method 300 proceeds to step 314.

At step 314, technology and partner activity are identified. For example, a single service or outsource supplier 104 has technology controlled by a single source. In the case of multiple supplier/service, the technology and/or infrastructure may be selected or recommended in accordance with the type of integration specified for the network and data structure and may match the identified strategies. The step 314 may include negotiating and/or resolving conflicts and incompatibilities (e.g., technically, logically) between suppliers 104, network 102 and assets 108 to achieve a successful user acceptance and/or tool implementation of the selected processes. If the technology and/or partners are not integrated at decisional step 316, then execution returns to step 314. If the technology and/or partners are integrated, then, at step 318, leveragability and knowledge management are determined. For example, this step 318 may verify that the structured flexibility satisfies the needs and/or requirements of a scalable multi-supplier environment. In addition, the step 318 may verify that appropriate modeling techniques are leveraged for current and forecasted performance, capacity and/or throughput. In some implementations, the current tools can be mapped to the integration plan. If the processes are not deployable at decisional step 320, then execution returns to step 314. If the processes are deployable at decisional step 320, then at step 322, organization stakeholder change is managed. This step may be executed as a logical extension of the previous steps, can be selected after the optimization and update of the enterprise processes, the addition of new manual activities and/or the implementation of new or modified tools. In some implementations, this step can be executed to address resistance to change, map process roles to organization roles and/or align service integrator roles to provider roles. In some instances, specific induction, training and education programs may be developed to provide stakeholders with the skills and/or knowledge for planning, implementing and/or sustaining process changes.

The step 324 includes managing operations when executed. For example, the step 324 may include monitoring and/or controlling the updated processes. In some implementations, the multi-supplier model 110 is implemented in response to at least implementing integration tasks/activities scheduled in the previous steps, transferring data between suppliers 104 and/or streamlining service delivery and support processes. The step 324 may include identifying a metrics for tracking and/or monitoring business value measures, transition measures, and/or change readiness measures. Such data may be fed to the enterprise dashboard to represent a single view in the presentation layer. In addition, the step 324 may also include analyzing reports generated during the implementation of the multi-supplier model 110, evaluating and assess the progression of the implementation, determining lessons learned from the implementation, and/or determining benefits of implementing the multi-supplier model 110.

Figure 4:
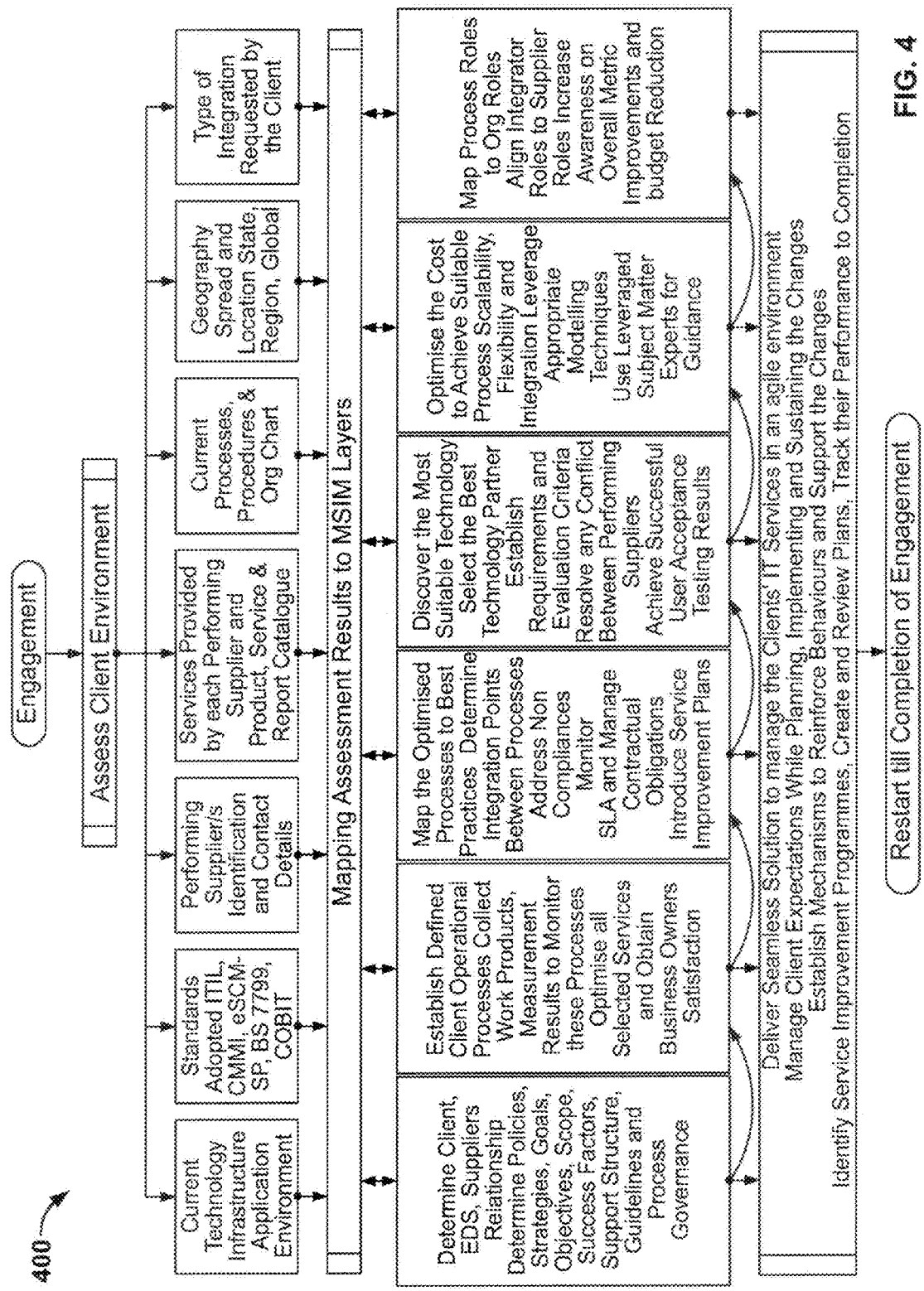
FIG. 4 is an example flow chart illustrating that parallel processes in accordance with some implementations of the present disclosure.

FIG. 4 illustrates a flow chart 400 representing one or more steps of the method 300 of FIG. 3 in accordance with the present disclosure. In particular, the chart 400 includes different representations of steps including the assessment and the seven layers of the multi-supplier model 110. As indicated, the chart 400 demonstrates that the multi-supplier model 110 may not be sequential. In illustrating several of the steps as a parallel process, the chart 400 may have flexibility, intelligence and logic built in to address a variety of enterprise and/or environment needs. For example, the enterprise may elect that after defining the strategies in Layer 1 (Step 304 in FIG. 3) to deploy and executing Layer 4 (Step 314 in FIG. 3).

Figure 5:
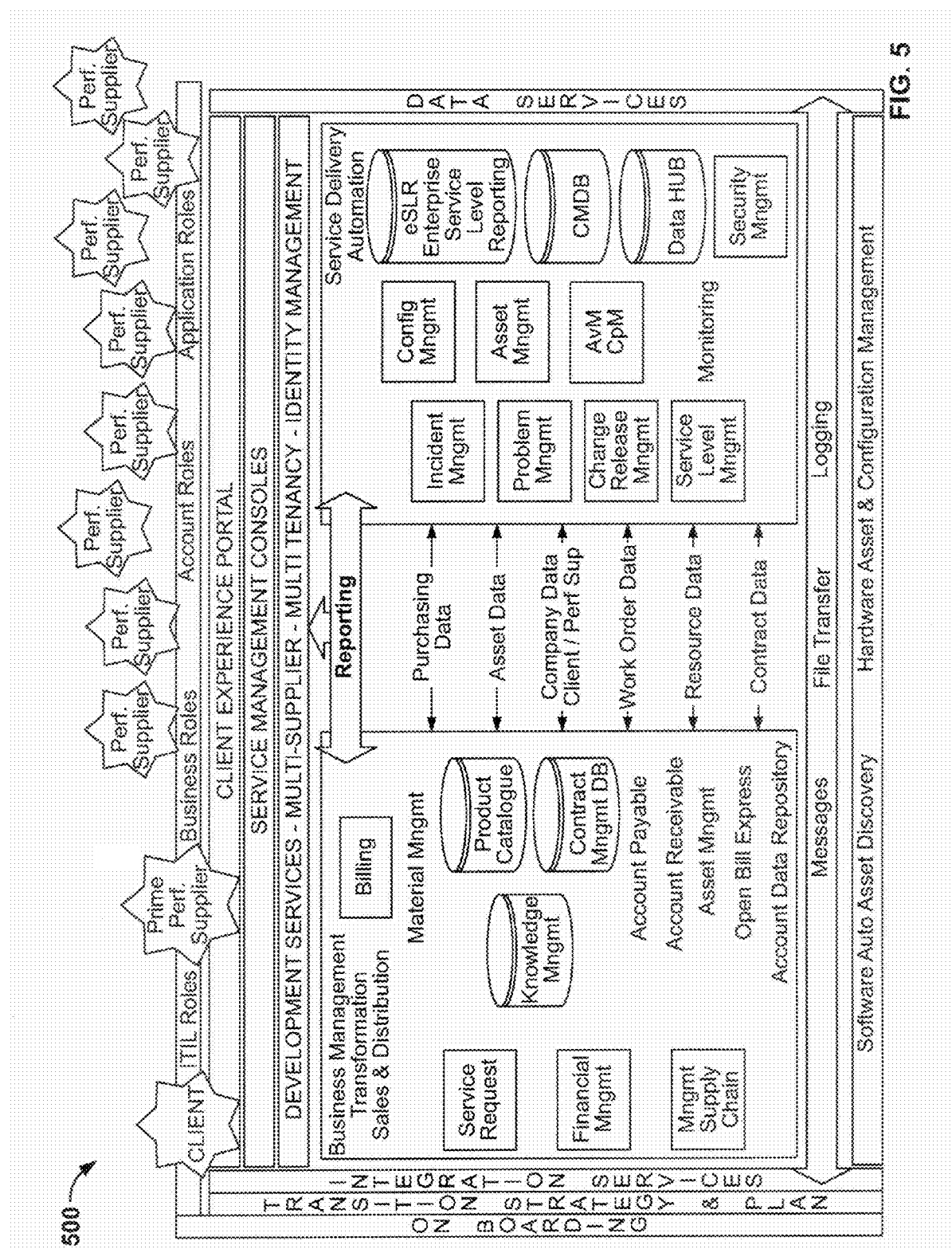
FIG. 5 is an example diagram illustrating data and processes in the management system of FIG. 1.

FIG. 5 illustrates an example consolidated diagram 500 illustrating an end-to-end view of various processes in the system 100 in accordance with some implementations of the present disclosure. For example, the diagram 500 includes an end-to-end view data in motion, inter-relation between modules, and/or the different offerings in a multi-supplier environment.

A number of embodiments of the invention have been described. Nevertheless, it will be understood that various modifications may be made without departing from the spirit and scope of the invention.

What is claimed is:

1. A method for managing a multi-supplier environment, comprising:
   in response to at least a request for an enterprise transaction, identifying a multi-supplier model configured to identify information for executing different aspects of the transaction associated with different enterprise departments and a primary supplier from a plurality of selectable third-party suppliers, the model configured to identify methodologies for executing the different aspects of a transaction;
   generating a plurality of requests for the different enterprise departments and the primary supplier based, at least in part, on the supplier model and the transaction request, each of the different enterprise departments and the primary supplier associated with at least one of the plurality of requests;
   identifying a document for an aspect of the transaction associated with one of the different enterprise departments;
   automatically populating said identified document with data associated with a corresponding transaction aspect; and
   automatically transmitting each of the plurality of requests to at least one of the associated enterprise departments or the primary supplier in accordance with the multi-supplier model.

2. The method of claim 1, further comprising:
   receiving an indication of acceptance of services provided by one of the plurality of selectable third-party suppliers;
   in response to at least the acceptance, automatically transmitting to an enterprise accounting department a request for approving payment in accordance with the multi-supplier model; and
   in response to at least receiving approval, automatically transmitting a request to generate the payment in accordance with the multi-supplier model.

3. The method of claim 1, further comprising:
   transmitting the supplier model to each of the plurality of selectable third-party suppliers; and
   receiving information associated with different aspects of transactions from the plurality of selectable third-party suppliers in accordance with the transmitted supplier model.

4. The method of claim 1, wherein the generated requests are automatically routed to the different departments and the primary supplier using the multi-supplier model.

5. The method of claim 1, further comprising generating a presentation based, at least in part, on the different aspects of the transaction, wherein transmission of data between the different departments and the primary supplier are transparent to a user.

6. The method of claim 1, further comprising:
   determining data associated with the multi-supplier model as processed during operation of the enterprise; and
   periodically updating the multi-supplier model based, at least in part, on the determined data.

7. The method of claim 1, wherein generating the plurality of requests includes at least one of translating data, filtering data, or routing data between different network topologies.

8. Software for managing transactions comprising computer readable instructions embodied on media and operable to:
   in response to at least a request for a enterprise transaction, identify a multi-supplier model configured to identify information for executing different aspects of the transaction associated with different enterprise departments and a primary supplier from a plurality of selectable third-party suppliers, the multi-supplier model configured to identify methodologies for executing the different aspects of a transaction;
   generate a plurality of requests for the different enterprise departments and the primary supplier based, at least in part, on the multi-supplier model and the transaction request, each of the different enterprise departments and the primary supplier associated with at least one of the plurality of requests;
   identify at least one document for an aspect of the transaction associated with one of the different enterprise departments;
   automatically populate said at least one identified document with data associated with a corresponding transaction aspect; and
   automatically transmit each of the plurality of requests to at least one of the associated enterprise departments or the primary supplier in accordance with the multi-supplier model.

9. The software of claim 8, further operable to:
   receive an indication of acceptance of services provided by one of the plurality of selectable third-party suppliers;
   in response to at least the acceptance, automatically transmit to an enterprise accounting department a request for approving payment in accordance with the v model; and
   in response to at least receiving approval, automatically transmit a request to generate the payment in accordance with the multi-supplier model.

10. The software of claim 8, further operable to:
    transmit the supplier model to each of the plurality of selectable third-party suppliers; and
    receiving information associated with different aspects of transactions from the plurality of selectable third-party suppliers in accordance with the transmitted supplier model.

11. The software of claim 8, wherein the generated requests are automatically routed to the different departments and the primary supplier using the multi-supplier model.

12. The software of claim 8, further operable to generate a presentation based, at least in part, on the different aspects of the transaction, wherein transmission of data between the different departments and the primary supplier are transparent to a user.

13. The software of claim 8, further operable to:
    determine data associated with the multi-supplier model as processed during operation of the enterprise; and
    periodically update the multi-supplier model based, at least in part, on the determined data.

14. The software of claim 8, wherein the software operable to generate the plurality of requests includes the software operable to at least translate data, filter data, or route data between different network topologies.

15. A system for managing transactions expenses, comprising:
    memory configured to store a supplier model; and one or more processors configured to:
    in response to at least a request for a enterprise transaction, identify a multi-supplier model configured to identify information for executing different aspects of the transaction associated with different enterprise departments and a primary supplier from a plurality of selectable third-party suppliers, the multi-supplier model configured to identify methodologies for executing the different aspects of a transaction;
    generate a plurality of requests for the different enterprise departments and the primary supplier based, at least in part, on the supplier model and the transaction request, each of the different enterprise departments and the primary supplier associated with at least one of the plurality of requests;
    identify at least one document for an aspect of the transaction associated with one of the different enterprise departments;
    automatically populate said at least one identified document with data associated with a corresponding transaction aspect; and
    automatically transmit each of the plurality of requests to at least one of the associated enterprise departments or the primary supplier in accordance with the multi-supplier model.

16. The system of claim 15, the processors further configured to:
    transmit the multi-supplier model to each of the plurality of selectable third-party suppliers; and
    receiving information associated with different aspects of transactions from the plurality of selectable third-party suppliers in accordance with the transmitted supplier model.

17. The system of claim 15, wherein the generated requests are automatically routed to the different departments and the primary supplier using the multi-supplier model.

18. The system of claim 15, the processors further configured to generate a presentation based, at least in part, on the different aspects of the transaction, wherein transmission of data between the different departments and the primary supplier are transparent to a user.

* * * * *